United States Patent
DeLuccia, Jr. et al.

(10) Patent No.: US 11,286,119 B2
(45) Date of Patent: Mar. 29, 2022

(54) AIR ASSISTED HOPPER SYSTEM FOR PELLET-SHAPED ARTICLES

(71) Applicant: ACKLEY MACHINE CORPORATION, Moorestown, NJ (US)

(72) Inventors: Vincent M. DeLuccia, Jr., Riverside, NJ (US); James T. McNamee, Plymouth Meeting, PA (US)

(73) Assignee: Ackley Machine Corporation, Moorestown, NJ (US)

( * ) Notice: Subject to any disclaimer, the term of this patent is extended or adjusted under 35 U.S.C. 154(b) by 0 days.

(21) Appl. No.: 17/051,548

(22) PCT Filed: Aug. 2, 2019

(86) PCT No.: PCT/US2019/044803
§ 371 (c)(1),
(2) Date: Oct. 29, 2020

(87) PCT Pub. No.: WO2020/028753
PCT Pub. Date: Feb. 6, 2020

(65) Prior Publication Data
US 2021/0229929 A1  Jul. 29, 2021

Related U.S. Application Data

(60) Provisional application No. 62/857,901, filed on Jun. 6, 2019, provisional application No. 62/714,372, filed on Aug. 3, 2018.

(51) Int. Cl.
*B65G 47/19* (2006.01)
*B65G 17/36* (2006.01)
(Continued)

(52) U.S. Cl.
CPC ............. *B65G 47/19* (2013.01); *B65G 17/36* (2013.01); *B65G 33/06* (2013.01);
(Continued)

(58) Field of Classification Search
CPC ...... B65G 17/126; B65G 17/36; B65G 33/06; B65G 47/1471; B65G 47/18; B65G 47/19;
(Continued)

(56) References Cited

U.S. PATENT DOCUMENTS 2,794,686 A   6/1957 Anselman et al.
2,931,292 A * 4/1960 Ackley .................. B41F 17/36
                                                 101/37

(Continued)

OTHER PUBLICATIONS

International Search Report for PCT/US2019/044803, dated Oct. 25, 2019, 3 pages.
(Continued)

*Primary Examiner* — Gene O Crawford
*Assistant Examiner* — Keith R Campbell
(74) *Attorney, Agent, or Firm* — Nixon & Vanderhye P.C.

(57) ABSTRACT

An apparatus that conveys pellet-shaped articles may include a hopper that receives a quantity of the pellet-shaped articles. The hopper may include one or more openings to direct a flow of air into the hopper to dislodge jamming or bridging of pellet-shaped articles within the hopper.

36 Claims, 13 Drawing Sheets

(51) Int. Cl.
*B65G 33/06* (2006.01)
*B65G 47/14* (2006.01)

(52) U.S. Cl.
CPC .... *B65G 47/1471* (2013.01); *B65G 2201/027* (2013.01); *B65G 2203/0208* (2013.01); *B65G 2203/042* (2013.01)

(58) Field of Classification Search
CPC ........ B65G 2201/06; B65G 2203/0208; B65G 2203/042
See application file for complete search history.

(56) References Cited

U.S. PATENT DOCUMENTS

| | | | |
|---|---|---|---|
| 3,210,131 A | | 10/1965 | Booth et al. |
| 3,272,118 A | * | 9/1966 | Ackley .............. B65G 47/1471 101/37 |
| 3,380,780 A | | 4/1968 | Allen et al. |
| 3,713,564 A | * | 1/1973 | Cottrell ................ B65D 88/706 222/1 |
| 3,756,402 A | * | 9/1973 | Wagers, Jr. ............. A61J 3/074 209/541 |
| 4,059,311 A | * | 11/1977 | Spitzer .................. B65G 53/22 406/93 |
| 4,189,996 A | * | 2/1980 | Ackley, Sr. ............. B41F 17/36 101/37 |
| 2013/0277171 A1 | | 10/2013 | Ackley et al. |

OTHER PUBLICATIONS

Written Opinion of the ISA for PCT/US2019/044803, dated Oct. 25, 2019, 4 pages.

* cited by examiner

AIR ASSISTED HOPPER SYSTEM FOR PELLET-SHAPED ARTICLES

CROSS-REFERENCE TO RELATED APPLICATIONS

This application is the U.S. national phase of International Application No. PCT/US2019/044803 filed Aug. 2, 2019, which designated the U.S. and claims the benefit of U.S. Provisional Application Nos. 62/857,901, filed Jun. 6, 2019, and 62/714,372, filed Aug. 3, 2018, the entire contents of each of which are incorporated herein by reference.

FIELD OF THE TECHNOLOGY

The present technology relates to methods and apparatuses for transporting, inspecting, and processing pellet-shaped articles, e.g., tablets, caplets, lentil-shaped articles, etc.

BACKGROUND OF THE TECHNOLOGY

Processing of pellet-shaped articles (e.g., tablets, caplets, lentil-shaped articles, etc.), such as marking the articles with indicia, coloring the articles, laser drilling holes in the articles, coating the articles, and/or inspecting the articles is known in the art. The articles may be transported past one or more processing stations (e.g., printing, inspection, drilling, rejection, etc.) by carrier links with article receiving pockets.

Existing conveyer apparatuses may include a hopper that receives a bulk quantity of pellet-shaped articles that may be processed in accordance with the methods described in the preceding paragraph (e.g., printing, inspection, drilling, rejection, etc.). FIGS. 2A-2C depict views of pellet-shaped articles 32 having an oblong shape. Pellet-shaped articles 32 of such an oblong shape may be particularly susceptible to jamming within the hopper due to their irregular dimensions (i.e., having a dimension along a first axis that is greater than a dimension along a second axis that is orthogonal to the first axis). Although pellet-shaped articles 32 of other shapes, such as round tablets, may also be susceptible to jamming. Additionally, pellet-shaped articles 32 may be susceptible to adhering to one another and to surfaces of the conveyer apparatus due to the nature of the surface of the pellet-shaped articles 32. For example, gel-based pellet-shaped articles 32 may be particularly susceptible to such adhering.

The jamming problem may manifest itself by the pellet-shaped articles "bridging" across the path of the carrier links through the hopper. Within the hopper, screw drives may be provided to feed the pellet-shaped articles into the carrier links. Bridging refers to the phenomenon whereby a bulk quantity of pellet-shaped articles randomly orient themselves such that the shape of the pellet-shaped articles, as well as the friction forces between adjacent pellet-shaped articles and with surfaces of the hopper, cause the pellet-shaped articles to bind above the moving carrier links and screw drives. However, when the pellet-shaped articles form a bridge (e.g., as described above) above the carrier links, it is no longer possible to feed pellet-shaped articles into the carrier links for further processing. Thus, the bridged pellet-shaped articles present a barrier to feeding further pellet-shaped articles into the carrier links for subsequent processing.

Explained a different way, especially with an infeed hopper having a V shape, where the distance between the hopper sides gets narrower at the bottom as the product gets closer to the carrier links, after running the conveyor for a period of time, the product in the infeed hopper interlocks together in a way that causes them to form a 'bridge' just above the carrier links (the narrowest area of the hopper). The weight of the product in the hopper does not produce enough gravitational force to 'unlock' the product and allow it to fall into the carrier links. For complex geometric shaped products or articles and products or articles with a rough or 'sticky' surface finish, such as softgels and oblong caplets, the products or articles interlock together more frequently, which significantly reduces the fill rate of the carrier links over a period of operation of the conveyer apparatus. This results in lower throughput of the machine, and inconsistent, light and dark printed products or articles (print quality issues), for example due to the printing surfaces drying while articles are not fed through the printer.

The bridging problem may cause processing delays because the bridging of the pellet-shaped articles may result in downtime of the apparatus for resolution of the bridged pellet-shaped articles. Operational costs may be increased by having the apparatus run while not actually processing pellet-shaped articles. At the very least pellet-shaped articles are not being processed, even if the conveyer is running because carrier links are not being filled. Thus, it is beneficial to address the bridging problem (and any other jamming of pellet-shaped articles) as soon as it occurs and as effectively as possible.

Existing solutions to the bridging problem, as well as any other jamming of pellet-shaped articles, within the hopper have included manually breaking up the bridge or jam or agitating the hopper. Manually breaking up the bridge or jam may be accomplished by an operator's hand or some other object inserted into the bulk quantity of the pellet-shaped articles within the hopper. However, the operator is at risk of injury if their hand is caught in the turning screw drives or moving carrier links. Also, the apparatus may be damaged if another object is inserted into the hopper to break up the bridge or jam. Thus, the apparatus may need to be turned off to manually address the bridge or jam without risking injury to the operator or damage to the apparatus, which results in further operational downtime. Also, since the pellet-shaped articles may be intended for consumption (e.g., medicine or food articles), having an operator insert their hand or a foreign object into the hopper to break up the bridge or jam may cause an unsanitary condition that could result in waste of the contaminated pellet-shaped articles.

The alternative solution of agitating the hopper to shake loose the bridge or jam may also present other risks. An agitator may be difficult to operate in a manner that agitates the hopper sufficiently to break up any bridges or jams while at the same time not agitating the hopper so much that pellet-shaped articles are shaken from the hopper. Again, if the pellet-shaped articles are intended for consumption, having them ejected from the hopper to fall loosely around the apparatus or completely out of the apparatus may result in contamination, and therefore waste, of the pellet-shaped articles. In addition, the agitator (e.g., vibrator) may transmit vibration to surrounding structures which could result in increased wear and premature failure of bearings, etc. Thus, agitation does not provide an adequate solution to the bridging problem.

BRIEF SUMMARY OF THE TECHNOLOGY

An aspect of the present technology is directed to an apparatus for processing and/or inspecting pellet-shaped articles. The apparatus may include a conveyer for transporting the pellet-shaped articles past one or more units that process and/or inspect the pellet-shaped articles.

An aspect of the present technology is directed to an apparatus with a hopper that addresses the bridging and/or jamming issues within the hopper, while avoiding the downsides described above in connection with manually breaking up the bridge or jam or using an agitator to shake loose the pellet-shaped articles. The apparatus may convey the pellet-shaped articles.

An aspect of the present technology is directed to an apparatus that may include a hopper with one or more openings to direct a flow of air (e.g., a jet of air under pressure) into the hopper. The apparatus may convey the pellet-shaped articles.

An aspect of the present technology relates to a conveyor of pellet shaped articles that includes one or more (e.g., a series of) small air jet openings formed on, e.g., by machining, one or both of the hopper side frames, e.g., just above the carrier link feed area, which may be where the hopper is narrowest. The air jet openings may direct air toward the carrier links or the pellet-shaped articles, e.g., in a downward direction, to break up the bridge of pellet-shaped articles and guide the pellet-shaped articles into the carrier links. For some difficult product geometries, this new design may allow the machine to run more quickly (e.g., at twice the speed) as compared to prior art machines having roughly the same hopper.

An aspect of the present technology is directed to a apparatus comprising: a conveyer path; a hopper configured to receive a plurality of pellet-shaped articles and direct the pellet-shaped articles towards the conveyer path, the hopper having at least one opening to direct a flow of air into the hopper.

In examples of the aspects described in the preceding paragraphs: (a) the hopper may comprise a hopper wall that faces the interior of the hopper, the hopper wall being configured to contain the pellet-shaped articles and direct the pellet-shaped articles towards the conveyer path, and the opening being formed on the hopper wall, (b) a plurality of openings may be formed on the hopper wall in a row oriented parallel to the conveyer path, (c) two hopper walls may be positioned opposite one another relative to the conveyer path, the hopper walls being configured to contain the pellet-shaped articles and direct the pellet-shaped articles towards the conveyer path; and a plurality of openings may be arranged in two rows with each row on a corresponding one of the hopper walls, (d) the hopper may comprise a hopper rail that faces the interior of the hopper, the hopper rail being configured to contain the pellet-shaped articles and direct the pellet-shaped articles towards the conveyer path, the hopper rail configured to support the hopper wall, and the opening being formed on the hopper rail, (e) a plurality of openings may be formed on the hopper rail in a row oriented parallel to the conveyer path, (f) two hopper rails may be positioned opposite one another relative to the conveyer path, the hopper rails being configured to contain the pellet-shaped articles and direct the pellet-shaped articles towards the conveyer path, and the hopper rails being configured to support corresponding hopper walls; and a plurality of openings may be arranged in two rows with each row on a corresponding one of the hopper rails, (g) each row of openings may extend along the entire length of the portion of the conveyer path that passes the hopper, (h) each row of openings may extend along less than the full length of the portion of the conveyer path that passes through the hopper, (i) a screw drive may be positioned adjacent the conveyer path and configured to direct the pellet-shaped articles into the conveyer path, the screw drive being connected to the hopper rail, (j) a screw drive may be connected to each of the hopper rails, each screw drive being positioned adjacent the conveyer path and configured to direct the pellet-shaped articles into the conveyer path, (k) a plurality of carrier links may be configured to pass through the hopper along the conveyer path, (l) a pressure generator may be configured to generate the flow of air at a pressure greater than ambient, the pressure generator further comprising a pump, a solenoid, or a blower, (m) the pressure generator may be configured to generate the flow of air continuously during operation of the apparatus while the carrier links are traveling along the conveyer path, (n) the pressure generator may be configured to generate the flow of air in periodic pulses during operation of the apparatus while the carrier links are traveling along the conveyer path, (o) the pressure generator may be configured to generate the flow of air at a pressure value that remains substantially consistent during operation of the apparatus while the carrier links are traveling along the conveyer path, (p) the pressure generator may be configured to generate the flow of air at a pressure value that varies during operation of the apparatus while the carrier links are traveling along the conveyer path, (q) a controller may be configured to control the apparatus, (r) the controller may be configured to control the pressure generator to generate the flow of air automatically during operation of the apparatus while the carrier links are traveling along the conveyer path without user input, (s) the controller may be configured to control the pressure generator to generate the flow of air manually during operation of the apparatus while the carrier links are traveling along the conveyer path in response to user input to a user input device, (t) a first sensor may be in communication with the controller and configured to detect whether pellet-shaped articles are being conveyed along the conveyer path; and a second sensor may be in communication with the controller and configured to detect whether pellet-shaped articles are contained within the hopper, and/or (u) a conveyer motor may drive the carrier links along the conveyer path.

Of course, portions of the aspects may form sub-aspects of the present technology. Also, various ones of the sub-aspects and/or aspects may be combined in various manners and also constitute additional aspects or sub-aspects of the present technology.

BRIEF DESCRIPTION OF THE DRAWINGS

The accompanying drawings facilitate an understanding of the various examples of this technology. In such drawings.

DETAILED DESCRIPTION OF THE TECHNOLOGY

Before the present technology is described in further detail, it is to be understood that the technology is not limited to the particular examples described herein, which may vary. It is also to be understood that the terminology used in this disclosure is for the purpose of describing only the particular examples discussed herein, and is not intended to be limiting.

The following description is provided in relation to various examples which may share one or more common characteristics and/or features. It is to be understood that one or more features of any one example may be combinable with one or more features of another example or other examples. In addition, any single feature or combination of features in any of the examples may constitute a further example.

Figure 1A:
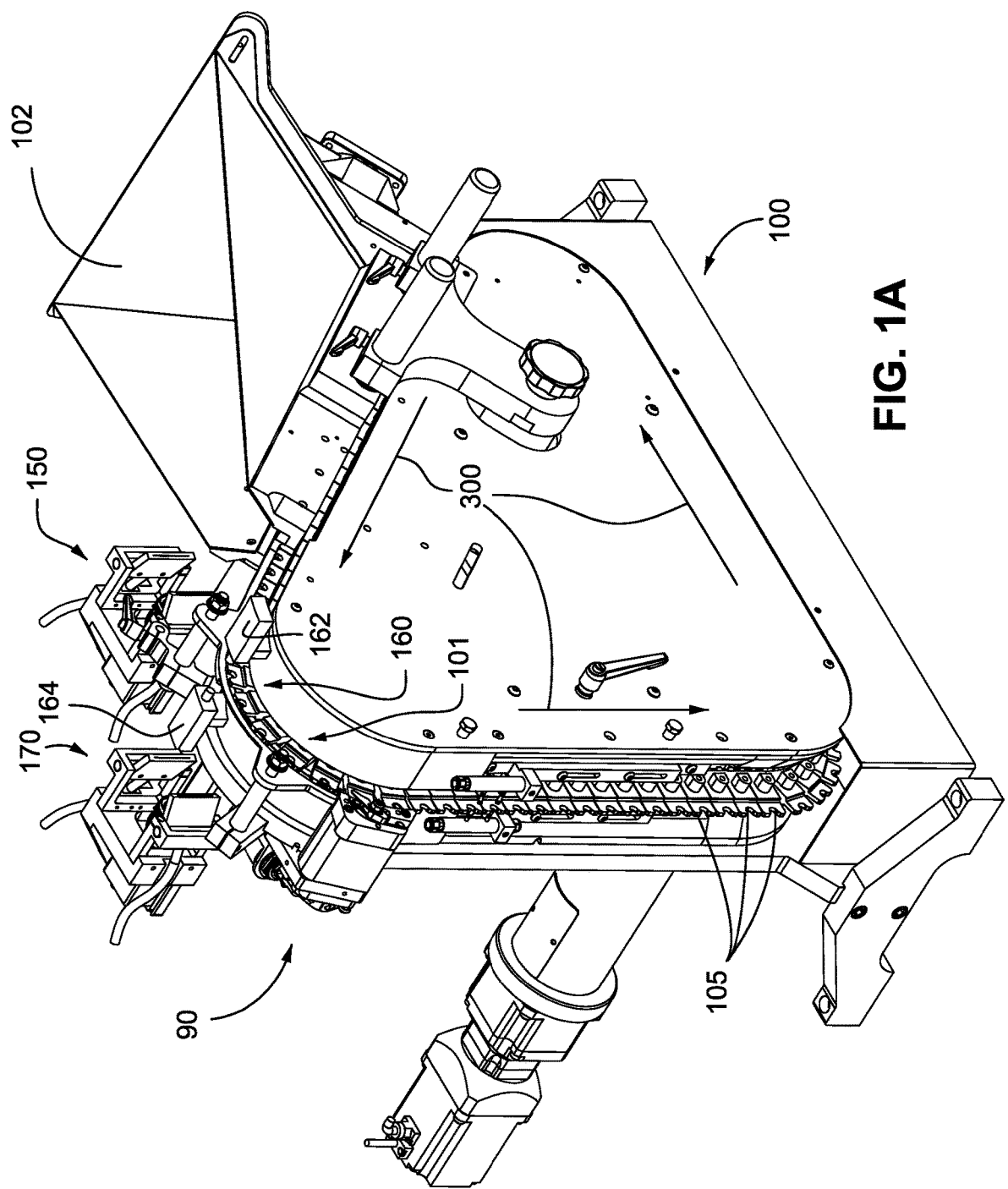
FIG. 1A is a perspective view of an apparatus including inspection, processing, and rejection units.

Depicted in FIG. 1 is an exemplary apparatus 100 for transporting, inspecting, and processing pellet-shaped articles. In the depicted example, the apparatus 100 may include a conveyer 101 that transports the pellet-shaped articles 32, 50 along a conveyer path 300. The conveyer 101 may also include carrier links 105, each having a pocket 107 to transport individual pellet-shaped articles 32, 50 along the conveyer path 300. The pockets 107 may be formed, at least partly, by teeth 106. Also, the carrier links 105 may be driven by a conveyer motor 403. It should be understood, however, that alternative examples of the technology may include carrier links 105 having multiple pockets 107 such that each carrier link 105 is able to transport multiple pellet-shaped articles 32, 50.

Figure 1B:
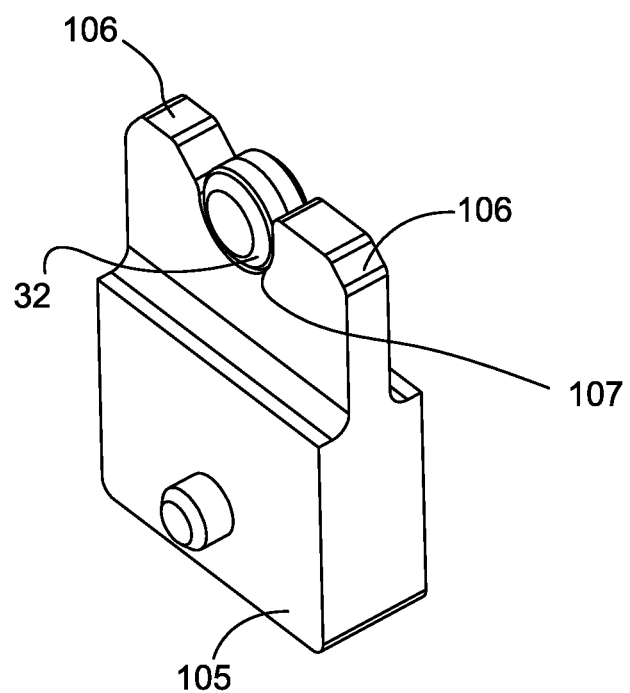
FIG. 1B is a perspective view of a carrier link for an apparatus and pellet-shaped article held by the carrier link.
Figure 1C:
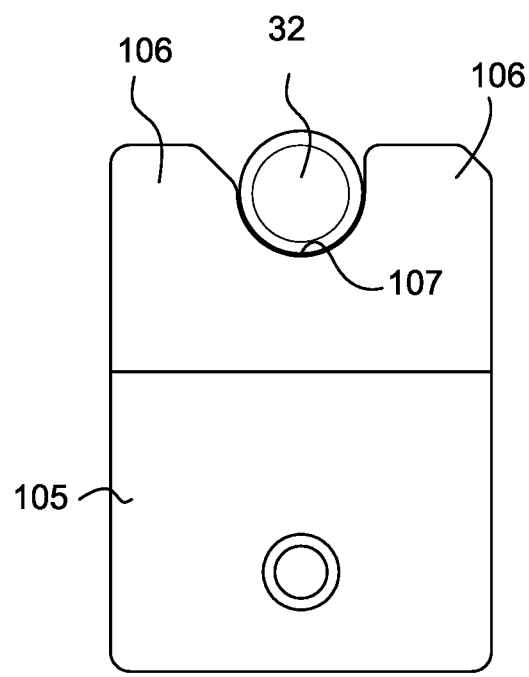
FIG. 1C is a side view of a carrier link for an apparatus and pellet-shaped article held by the carrier link.

The pellet-shaped articles 32, 50 may be fed onto the conveyer 101 by a hopper 102. The hopper 102 may include one or more walls 103. The hopper 102 may be designed to hold a large number of pellet-shaped articles 32, 50 supplied thereto in bulk. As the carrier links 105 of the conveyer 101 pass the hopper 102, pellet-shaped articles 32, 50 may be taken into pockets of the carrier links 105 for inspecting and processing by the apparatus 100. The pellet-shaped articles may be fed onto the carrier links 105 in a vertical or on-edge orientation, e.g., such that a plane defined through the major axis and the minor axis of the pellet-shaped article 32, 50 is parallel to the conveyer path 300. FIGS. 1B and 1C show how an individual pellet-shaped article 32, 50 may be held by the carrier link 105 while traveling along the conveyer path 300.

The pellet-shaped articles may be fed onto the conveyer 101 with their first and second sides 52, 54 oriented randomly relative to the conveyer path 300. This may occur as a result of the pellet-shaped articles 32, 50 being contained loosely in the hopper 102 in bulk and fed onto the conveyer 101. As will be discussed below, the randomness of the feeding of the pellet-shaped articles 32, 50 to the conveyer 101 may necessitate that the apparatus 100 determine the orientation of the first side 52 and the second side 54 so that each side receives the desired processing operation. An advantageous feature of this arrangement is that in examples of the present technology, the pellet-shaped articles 32, 50 need not be or are not inverted or flipped as they are transported on the conveyer 101 along the conveyer path 300. In other words, the orientation of the first side 52 and the second side 54 of the pellet-shaped articles 32, 50 does not change as the pellet-shaped articles 32, 50 pass along the conveyer path 300.

According to an example of the present technology, the pellet-shaped articles 32, 50 transported on the conveyer 101 may pass a first inspection unit 150 as shown in FIG. 1. The first inspection unit 150 may include at least one camera for inspecting the pellet-shaped articles. The features and functions of the first inspection unit 150 will be discussed in greater detail below.

After passing the first inspection unit 150, the pellet-shaped articles 32, 50 may then be processed by a processing unit 160 as shown in FIG. 1. The exemplary processing unit 160 may include a first laser 162 and a second laser 164 to process the pellet-shaped articles 32, 50. The features and functions of the processing unit 160 will be discussed in greater detail below.

Once processed, the pellet-shaped articles 32, 50 may pass a second inspection unit 170 as shown in FIG. 1. The second inspection unit 170 may include at least one camera for inspecting the pellet-shaped articles. The features and functions of the second inspection unit 170 will be discussed in greater detail below.

Once the pellet-shaped articles have passed the second inspection unit 170, they may pass an ejection unit 90 as shown in FIG. 1. The ejection unit 90 may be included in the apparatus 100 to eject pellet-shaped articles 32, 50 from the conveyer 101 that have been found by the inspection units 150, 170 to be defective and/or defectively processed.

After the pellet-shaped articles 32, 50 pass the ejection unit 90, they may continue on the conveyer 101 for further inspection, processing, storage, packaging, etc.

The processing unit 160 may include lasers (for lasering hole(s), logo(s), alphanumeric character(s), etc.), printers, composition-scanning devices, etc.

Figure 2B:
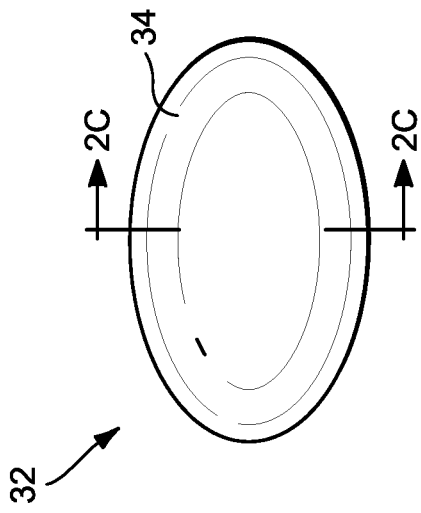
FIG. 2B is a top view of an example of a pellet-shaped article.
Figure 2C:
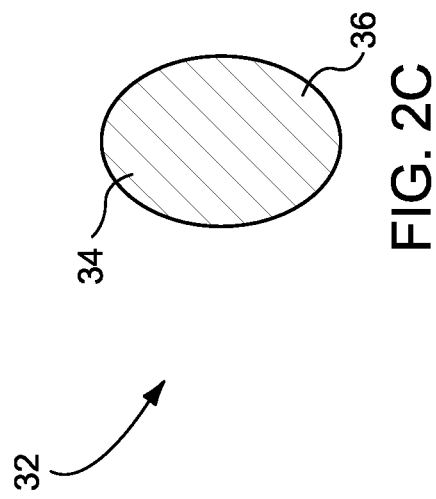
FIG. 2C is a cross-sectional view through line 2C-2C of FIG. 2B.
Figure 2A:
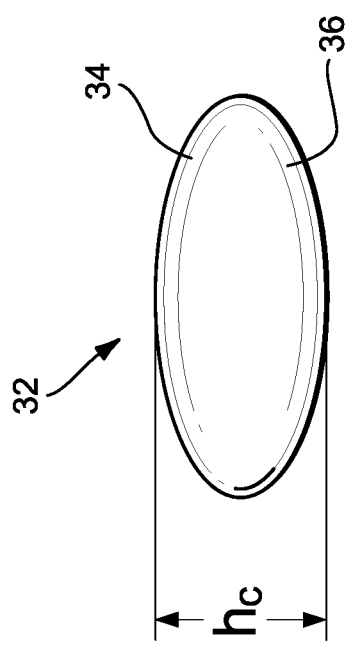
FIG. 2A is a side view of an example of a pellet-shaped article.

FIGS. 2A-2C show an exemplary pellet-shaped article 32. FIG. 2A shows a side view of the pellet-shaped article 32 with a height $h_C$. The pellet-shaped article 32 also has a top side or portion 34 and a bottom side or portion 36. FIG. 2B shows a top view of the pellet-shaped article 32 and the top side 34. FIG. 2C is a cross-sectional view of the pellet-shaped article 32 taken through line 2C-2C of FIG. 2B and shows the top side 34 and the bottom side 36.

Figure 2D:
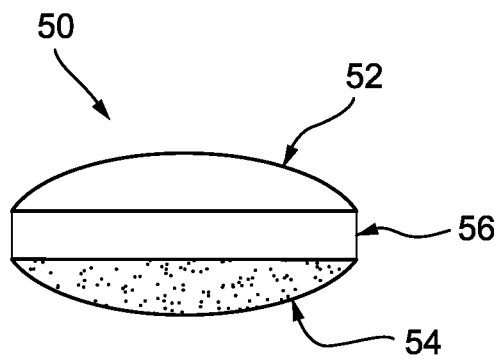
FIG. 2D is a side view of another exemplary pellet-shaped article.
Figure 2E:
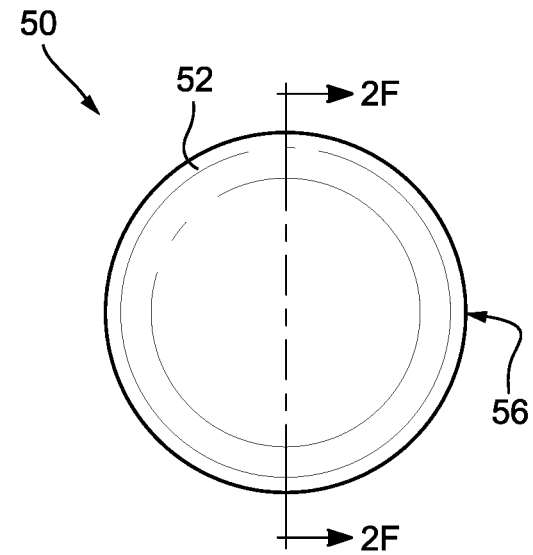
FIG. 2E is a top view of another exemplary pellet-shaped article.
Figure 2F:
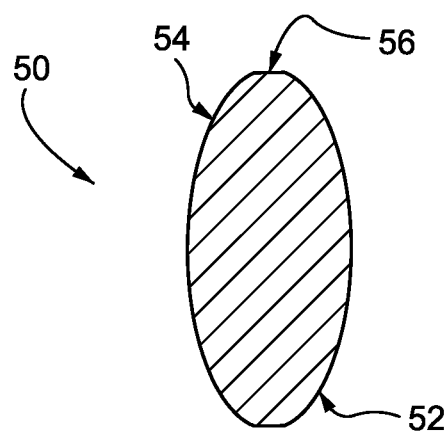
FIG. 2F is a cross-sectional view of another exemplary pellet-shaped article taken through line 2F-2F of FIG. 2E.

Another exemplary pellet-shaped article 50 is shown in FIGS. 2D-2F. FIG. 2D shows a side view of the pellet-shaped article 50 with a first side 52, a second side 54 opposite the first side, and a belly band 56 located between the first and second sides. The first side 52 and the second side 54 may have a first characteristic and a second characteristic, respectively, that are different from one another. This is indicated in FIG. 2D by stippling on the second side. The first and second characteristics may be, for example, colors and the first side 52 may be colored differently from the second side 54. The belly band 56 may be colored the same as one of the first side and the second side, or the belly band may be colored differently from both sides. FIG. 2E shows a top view of the pellet-shaped article 50 such that the first side is visible, as well as the belly band 56. FIG. 2E shows a cross-sectional view taken through line 2F-2F of FIG. 2E. The profile of the first side 52, the second side 54, and the belly band 56 can be seen in this view.

FIGS. 3-10 show examples of a hopper 102 for the apparatus 100, the hopper 102 being equipped with an air assist system that may be employed to break up bridged or jammed pellet-shaped articles 32, 50 within the hopper 102.

Figure 3:
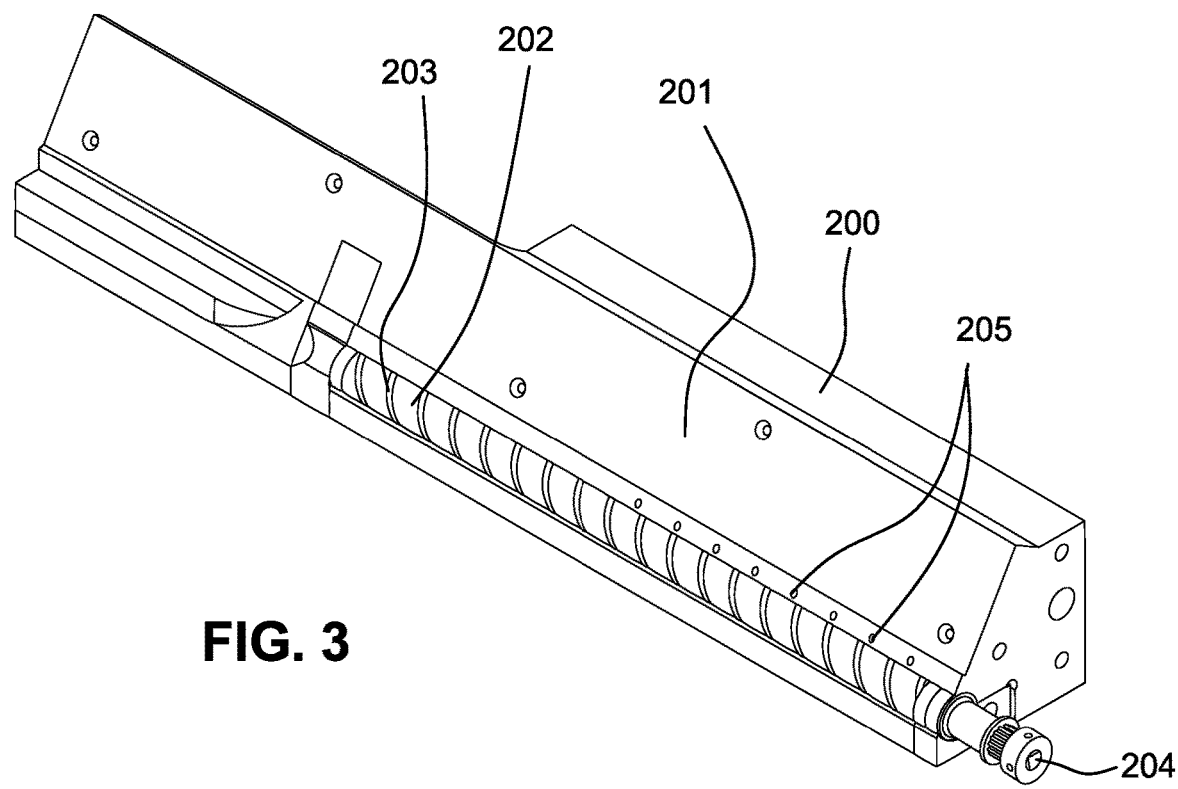
FIG. 3 is a perspective view of a hopper rail and a screw drive for an apparatus according to an example of the present technology.
Figure 4:
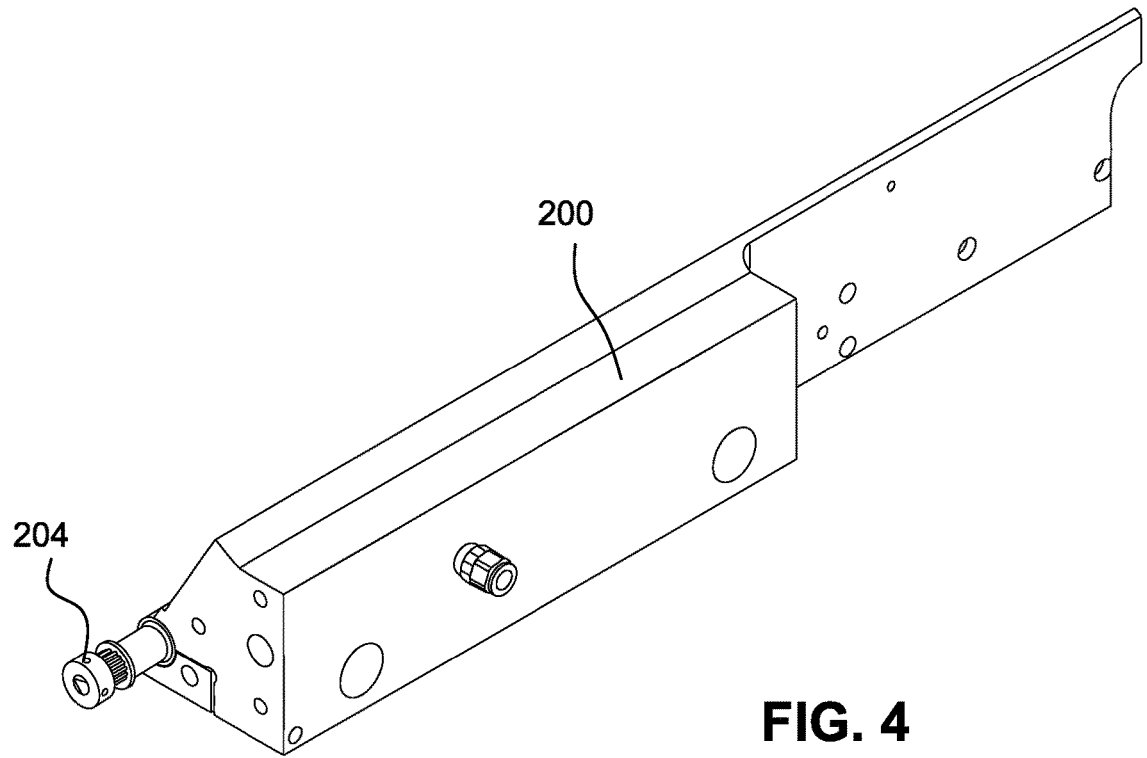
FIG. 4 is a perspective view of a hopper rail and a screw drive for an apparatus according to an example of the present technology.
Figure 5:
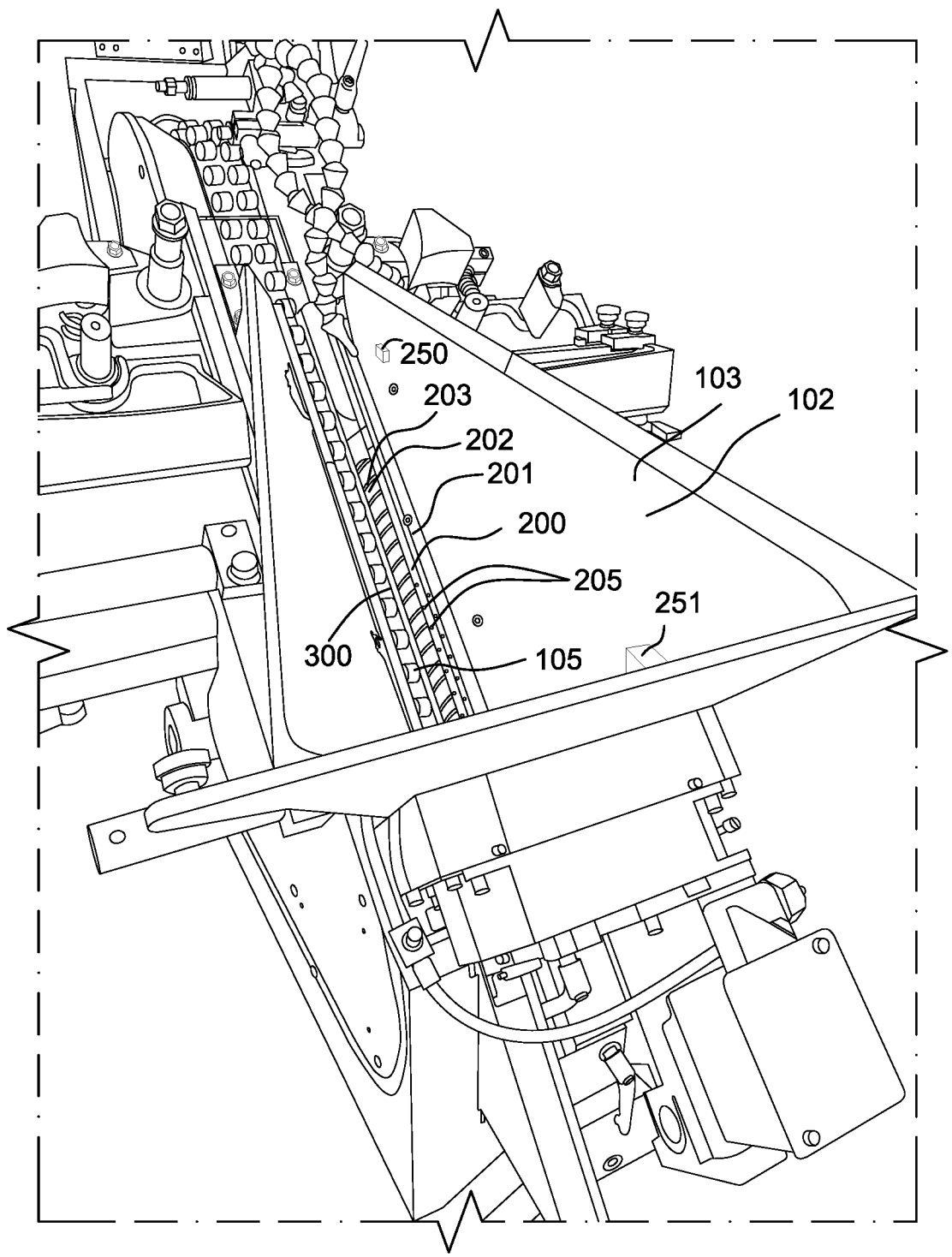
FIG. 5 a rear perspective view of a hopper for an apparatus according to an example of the present technology.
Figure 6:
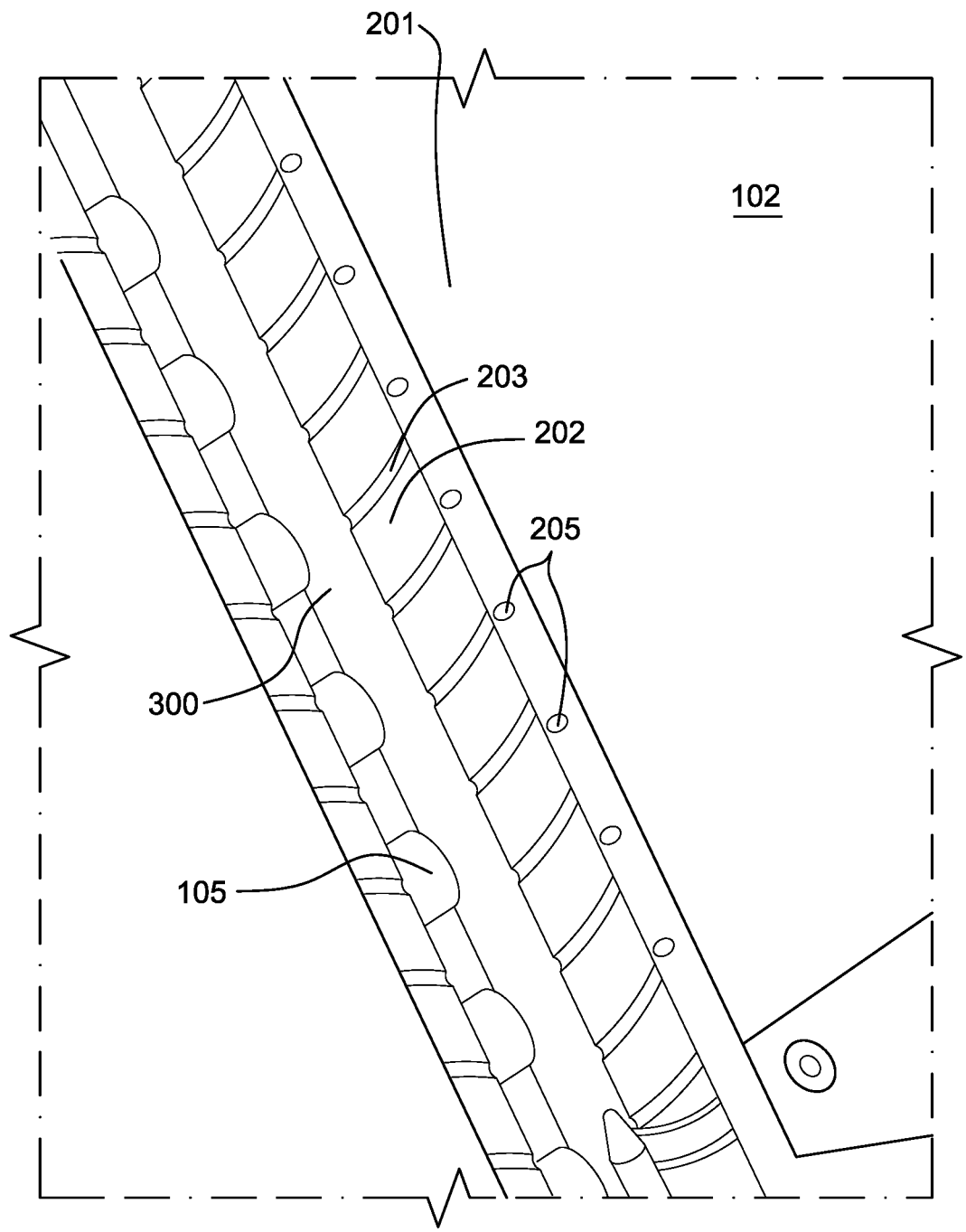
FIG. 6 is a detailed view of a hopper rail and a screw drive within a hopper for an apparatus according to an example of the present technology.

FIGS. 3 and 4 show a hopper rail 200 with a feeding face 201 having openings 205. The hopper rail 200 may also include a screw drive 202 with a recessed helix 203 for feeding pellet-shaped articles 32, 50 into the carrier links 105. The screw drive 202 may be rotated by a motor 206 connected to a hub 204. When the screw drive 202 is rotated (e.g., one screw drive 202 may be rotated counter-clockwise and one screw drive 202 may be rotated clockwise in the depicted example), the pellet-shaped articles are urged into the carrier links 105 of a conveyer path 300 (see FIGS. 5-7, 9, and 10).

Figure 7:
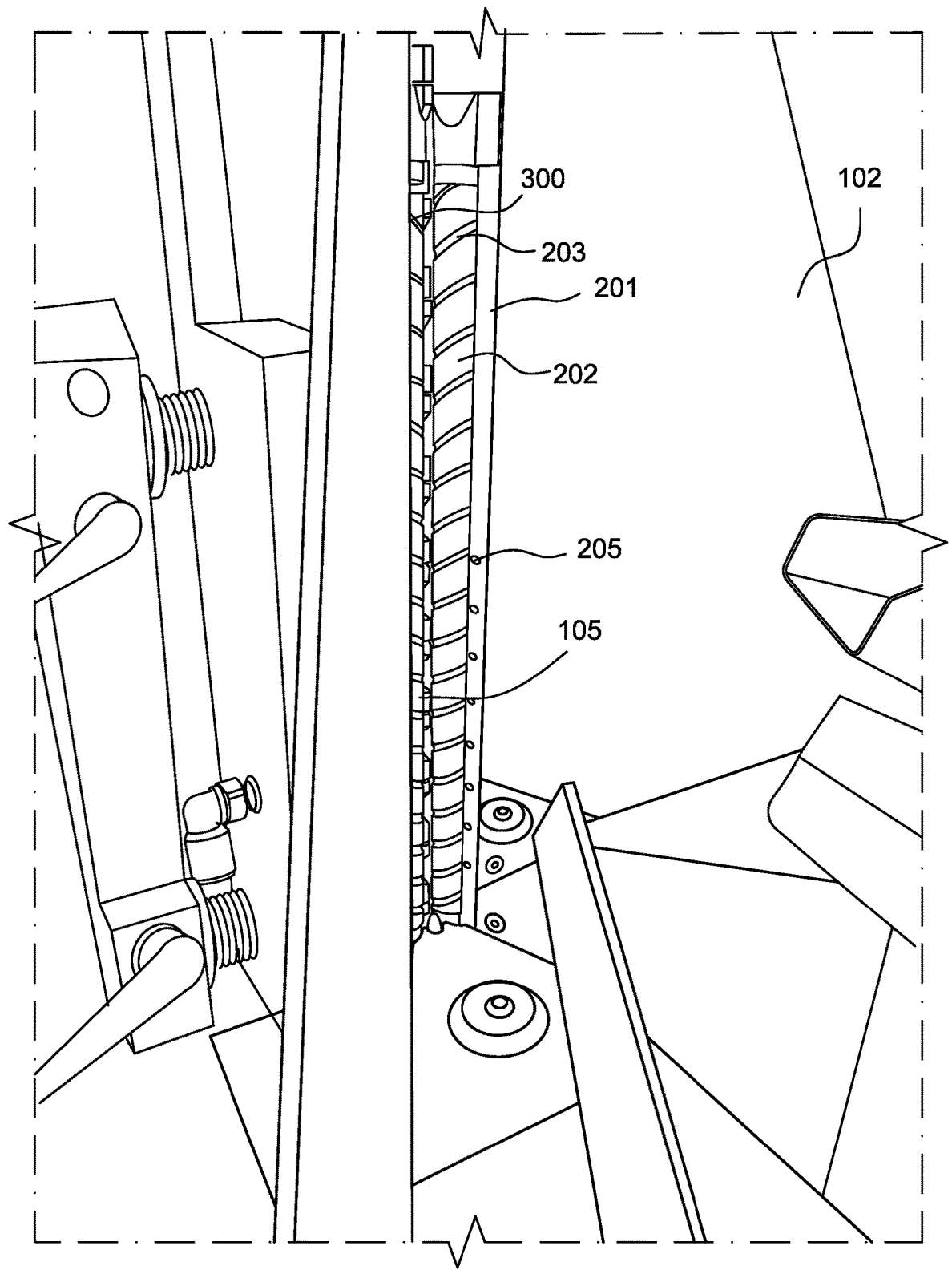
FIG. 7 is a detailed view of a hopper rail and a screw drive within a hopper for an apparatus according to an example of the present technology.
Figure 8:
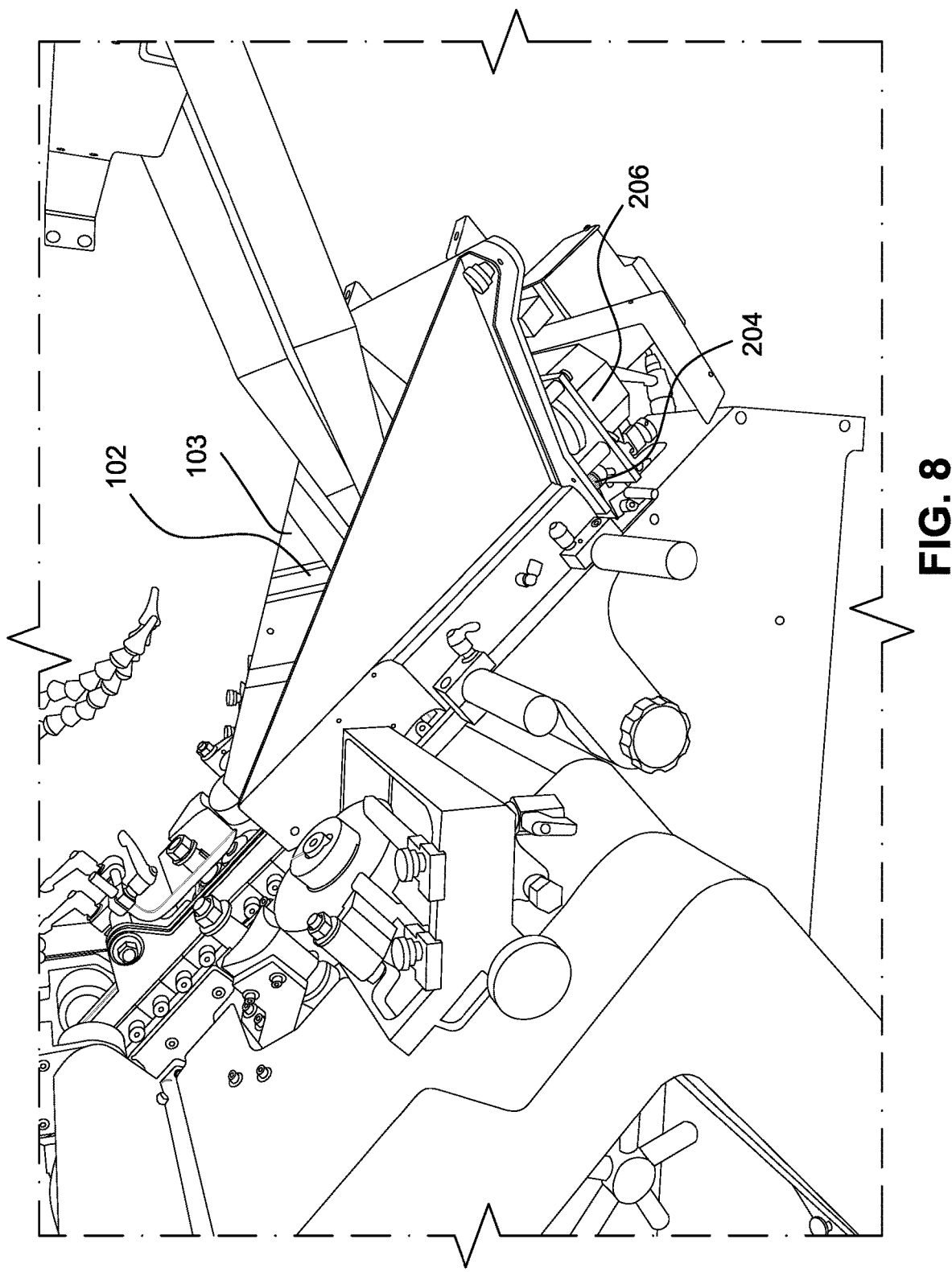
FIG. 8 is a side view of an apparatus having a hopper, a hopper rail, and a screw drive according to an example of the present technology.
Figure 9:
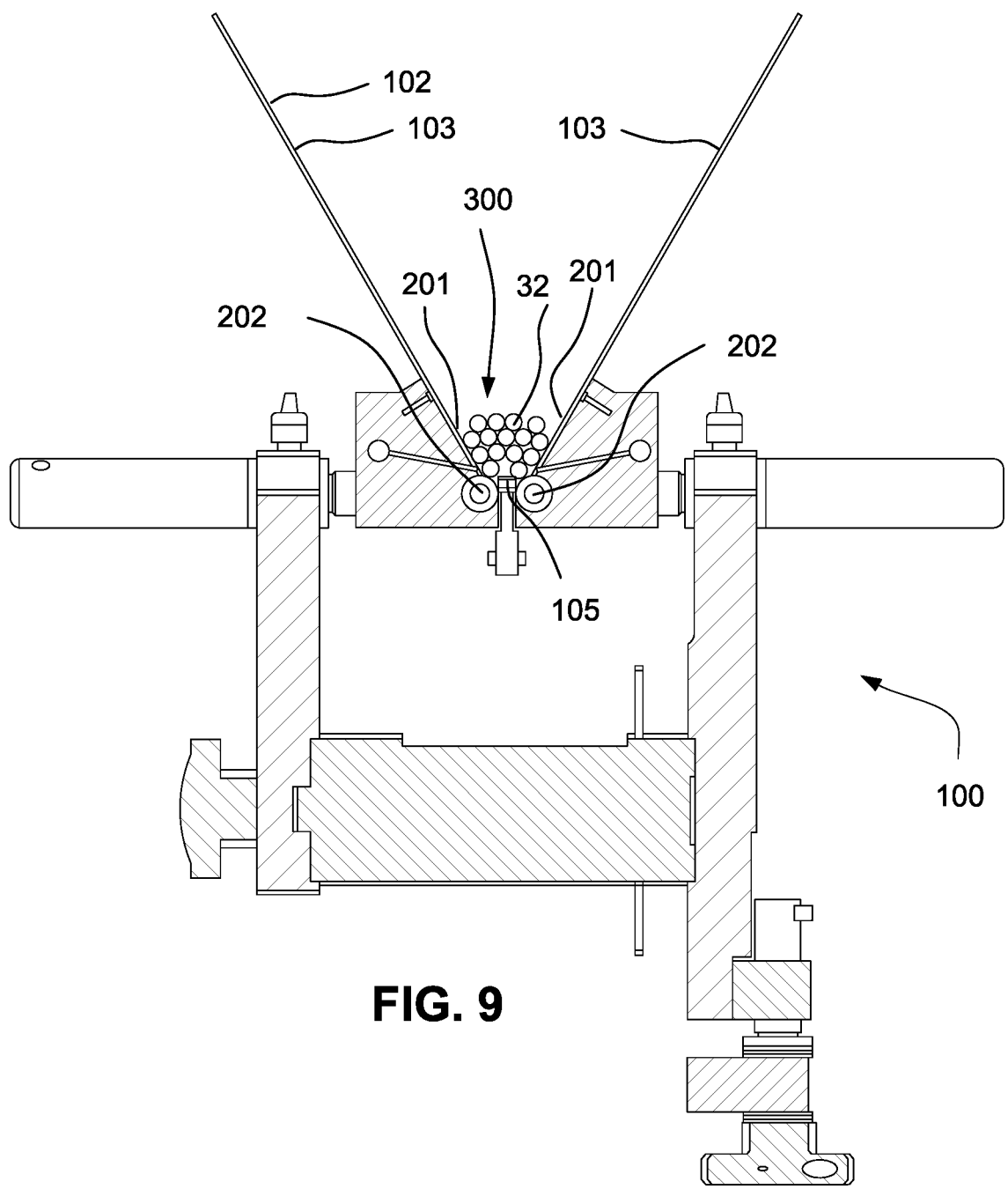
FIG. 9 is a cross-sectional view perpendicular to the path of travel of carrier links through an apparatus having a hopper, a hopper rail, and a screw drive according to an example of the present technology.
Figure 10:
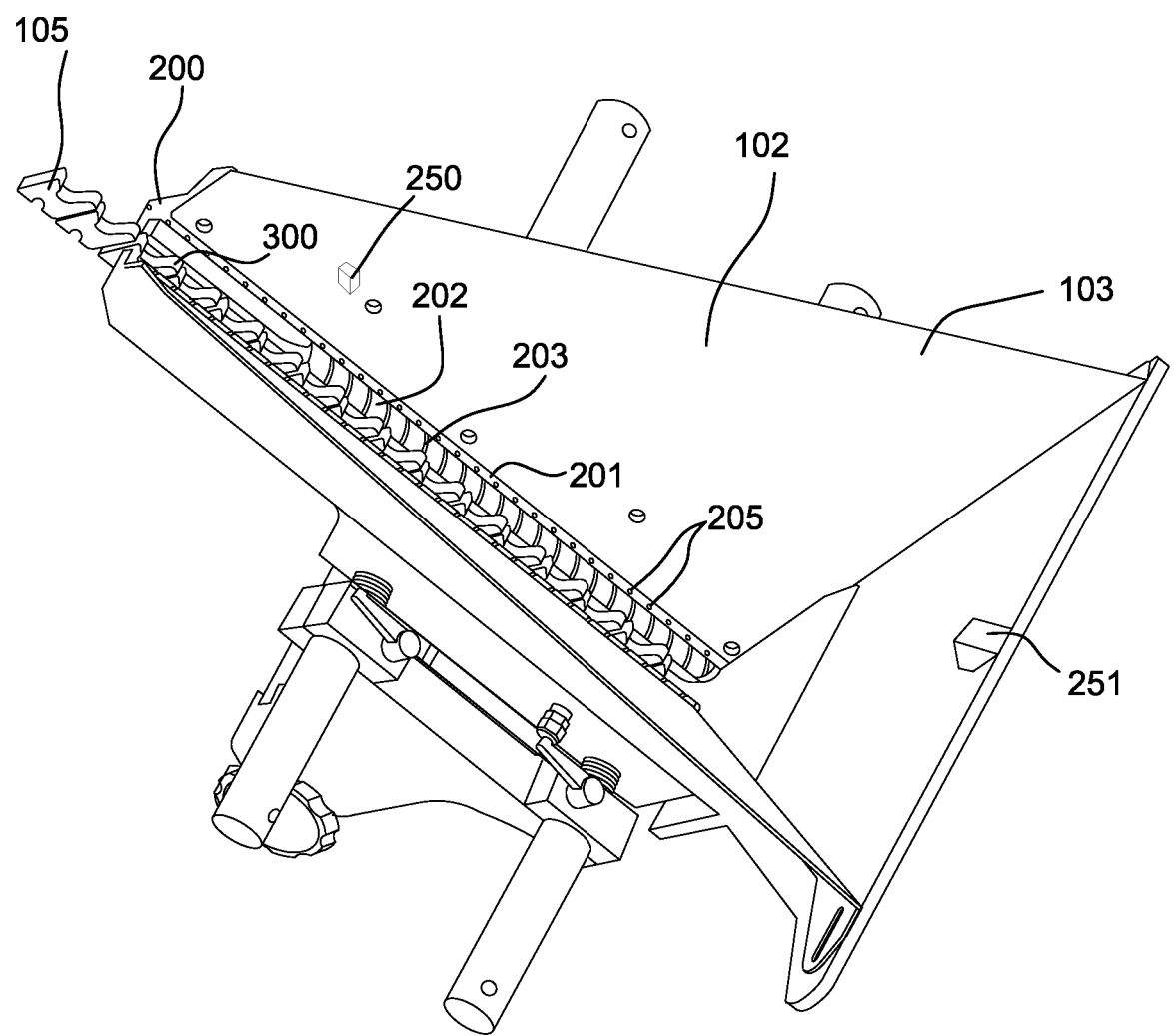
FIG. 10 is a detailed view of a hopper rail and a screw drive within a hopper for an apparatus according to an example of the present technology.

Two hopper rails 200 may be included with one on each side of the conveyer path 300, as shown in FIGS. 7 and 9. Thus, the screw drives 202 will rotate in opposite directions to urge pellet-shaped articles 32, 50 into the conveyer path 300 for capture by corresponding carrier links 105. As described in the Background section above, the pellet-shaped articles 32, 50 may form a bridge across the conveyer path 300 (i.e., spanning from one side of the hopper 102 to the other) such that further pellet-shaped articles 32, 50 are prevented from reaching the screw drives 202 and feeding into the carrier links 105. The present technology addresses this problem by providing a flow of air into the hopper 102 from one or more openings 205. A flow of air into the hopper 102 from the openings 205 may act on the pellet-shaped articles to prevent them from settling into a bridged or jammed state and/or may act on the pellet-shaped articles 32, 50 to separate pellet-shaped articles 32, 50 that have fallen into a bridged or jammed state.

The present examples depict a series of openings 205 formed in a row on the hopper rail 200. Since these examples also depict two hopper rails 200 (one on each side of the conveyer path 300), there would be two rows of openings 205 (one on each side of the conveyer path 300). While one row of openings 205 are shown on each side of the conveyer path 300, other examples of the present technology may include more than one row of openings 205 on each side of the conveyer path 300. However, it should be understood that one opening 205 alone (on one or both sides of the path) may be sufficient to disrupt or prevent bridging of the pellet-shaped articles 32, 50. Furthermore, one opening 205 on each side of the conveyer path 300 may be sufficient to disrupt or prevent bridging of the pellet-shaped articles 32, 50.

The openings 205 may be provided in rows forming straight lines or may be staggered with some openings 205 closer to the conveyer path 300 and some further away from the conveyer path 300. The openings 205 on one of the hopper rails 200 may be aligned with or offset with the openings 205 on the opposite hopper rail 200. In the depicted examples, the openings 205 are only provided along a portion of the length of the conveyer path 300 within the hopper 102 (e.g., along a lower portion of the hopper 102). However, in other examples, the row(s) of openings 205 may extend the full length of the conveyer path 300 within the hopper 102.

A pressure generator 402, such as a pump, a solenoid, or a blower, may pressurize gas or air and may be pneumatically connected to the openings 205, e.g., by tubing outside of the hopper 102. The pressure generator 402 may pressurize the air to a range of about 5 to about 50 PSI, depending on the weight of the pellet-shaped articles 32, 50, the shape of the pellet-shaped articles 32, 50, and/or the amount of bulk pellet-shaped articles 32, 50 contained in the hopper 102. The pressure generator 402 may direct a flow of air into the hopper 102 through the openings 205 continuously and/or in pulses. The flow of air may pass through all of the openings 205 simultaneously or the flow of air may alternate through different ones of the openings 205 (e.g., a progression from top to bottom or from bottom to top).

Figure 11:
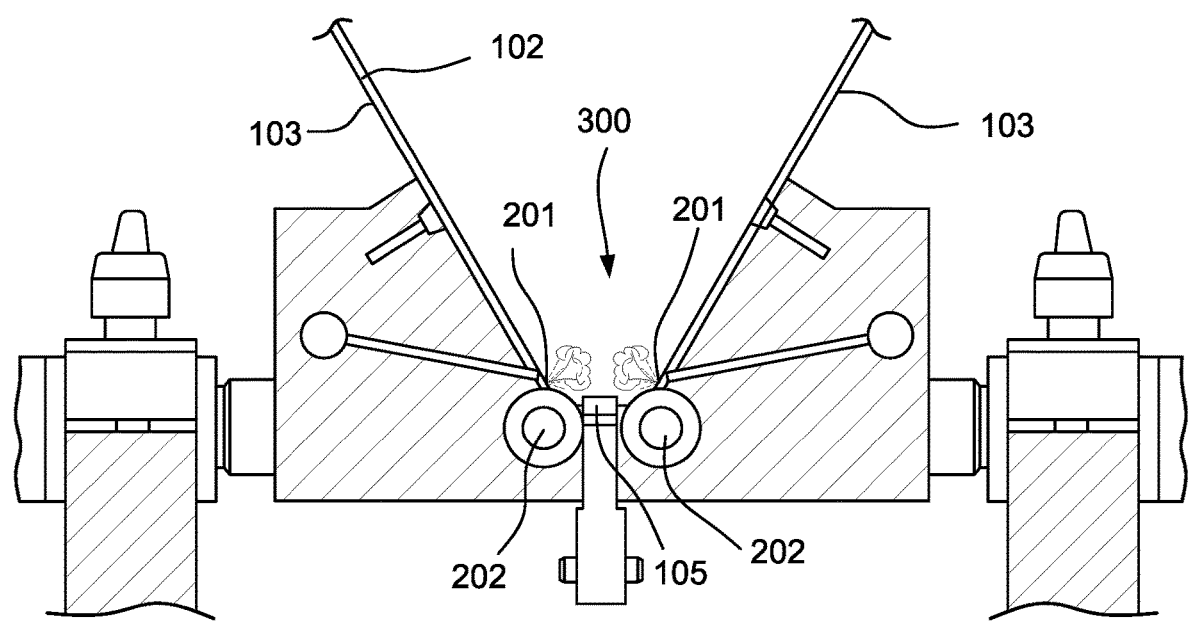
FIG. 11 is an enlarged view of a portion of FIG. 9 better showing the angle of the air jets relative to the hopper and carrier links.
Figure 12:
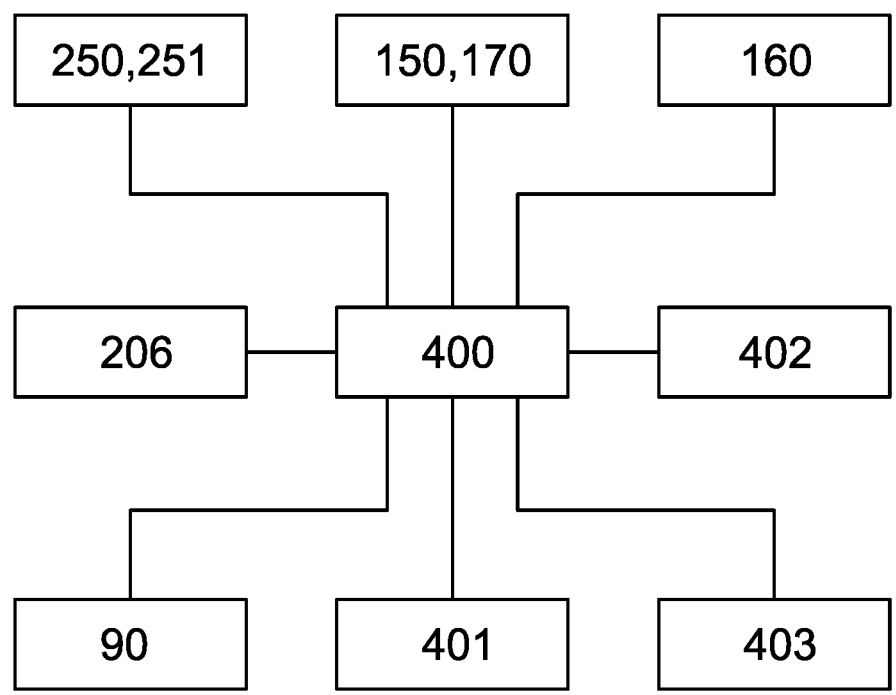
FIG. 12 is a schematic of components of an apparatus according to an example of the present technology.

The openings 205 may have a specific orientation with respect to the hopper 102. For example, as shown in FIG. 9, the openings 205 may be angled relative to horizontal, e.g., a slight downward angle of greater than 0 to about 15 degrees (including each whole number, i.e., 1, 2, 3, etc.) or more, e.g., between 8-14 degrees, e.g., 11 degrees. Also, the openings 205 may be positioned such that the resulting jet or stream of pressurized air is directed below the bulk pellet-shaped articles 32, 50 in the hopper 102, but above the turning screw drives 202 and the carrier links 105. However, the openings 205 may be provided or directed at a position on the hopper rails 200 or the side walls 103 that is higher or lower than what is shown in FIGS. 9 and 11.

Also, in addition or in the alternative to being angled relative to horizontal, the openings 205 may be angled to be perpendicular to the direction of travel of the conveyer 101, or they may be angled in the same direction as the direction of travel (upwards towards the top of the hopper 102) of the conveyer 101, or angled in the opposite direction as the direction of travel of the conveyer 101.

The pressure of the flow of air produced by the pressure generator 402 may be variable or remain at the same value during operation of the apparatus 100.

A controller 400 with memory and a processor may be included to control the pressure generator 402. The controller 400 may communicate with a user input device 401 to receive input from an operator or user. The controller 400 may communicate with a display to display information to the operator related to operation of the apparatus 100 and/or the pressure generator 402.

The hopper 102 may be arranged such that the openings 205 are positioned downstream of the top opening of the hopper 102 relative to the conveyer path 300 such that the openings 205 may direct the flow of air onto the bulk quantity of pellet-shaped articles 32, 50 before they reach the conveyer path 300. This arrangement allows the flow of air to act on the pellet-shaped articles to prevent or help disrupt bridging or jams before the pellet-shaped articles 32, 50 reach conveyer path 300.

Since the bulk quantity of pellet-shaped articles 32, 50 are fed into the conveyer links 105 on the conveyer path 300 by gravity, it may be advantageous for the opening(s) 205 to be provided to the lowest point of the conveyer path 300 within the hopper 102. Thus, even when the quantity of pellet-shaped articles in the hopper 102 is reduced over time during operation by virtue of pellet-shaped articles being transported out of the hopper 102 on the conveyer links 105 the remaining pellet-shaped articles at the lowest point of the hopper 102 will be acted upon by the flow of air. Accordingly, bridging can be prevented or disrupted even where there are relatively few pellet-shaped articles pellet-shaped articles 32, 50 remaining in the hopper 102.

While the hopper 102 described above in accordance with the depicted examples includes a hopper rail 200 on each of the conveyer path 300 with a series of openings 205 formed therein, it is also envisioned that the openings 205 may be formed directly in the walls 103 of the hopper 102. The hopper rails 200, and therefore the screw drives 202, may not be necessary.

The apparatus 100 may also include a first sensor 250 and a second sensor 251, each in communication with the controller 400. The first sensor 250 may be configured to detect whether pellet-shaped articles 32 are being conveyed along the conveyer path 300 in the carrier links 105. The second sensor 251 may be configured to detect whether pellet-shaped articles are contained within the hopper 102. The detection signals provided by the first sensor 250 and the second sensor 251 may allow the pressure generator 402 to be automatically controlled by the controller 400, i.e., without user input. Such automatic operation may be performed as follows.

The controller 400 may be instructing the conveyer motor 403 to drive the carrier links 105 and, if included, motors 206 to drive the screw drives 202. The controller 400 may also receive a signal from the second sensor 251 indicating the presence or absence of pellet-shaped articles 32, 50 in the hopper 102. The controller 400 may also receive a signal from the first sensor 250 indicating the presence or absence of pellet-shaped articles 32, 50 in the carrier links 105 along the conveyer path 300. Alternatively, if the controller 400 does not receive a signal from the first sensor 250 or the second sensor 251, that may indicate the presence or absence of pellet-shaped articles 32 in the hopper 102 or in the carrier links 105 along the conveyer path 300. Thus, if the controller 400 determines, based on the signals received or not received from the first sensor 250 and the second sensor 251, that pellet-shaped articles 32 are in the hopper 102 but not in the carrier links 105 along the conveyer path 300 while the carrier links 105 are driven by the conveyer motor 403, then the pellet-shaped articles 32 may be bridged or jammed in the hopper 102 and the controller 400 may instruct the pressure generator 402 to send pressurized air into the conveyer path 300 to break up the bridge or jam.

While the technology has been described in connection with what is presently considered to be the most practical and preferred examples, it is to be understood that the technology is not to be limited to the disclosed examples, but on the contrary, is intended to cover various modifications and equivalent arrangements included within the spirit and scope of the appended claims.

REFERENCE SIGNS LIST

| | |
|---|---|
| pellet-shaped article | 32 |
| top side | 34 |
| bottom side | 36 |
| pellet-shaped article | 50 |
| first side | 52 |
| second side | 54 |
| belly band | 56 |
| ejection unit | 90 |
| apparatus | 100 |
| conveyer | 101 |
| hopper | 102 |
| wall | 103 |
| carrier link | 105 |
| teeth | 106 |
| pocket | 107 |
| first inspection unit | 150 |
| processing unit | 160 |
| first laser | 162 |
| second laser | 164 |
| second inspection unit | 170 |
| hopper rail | 200 |
| feeding face | 201 |
| screw drive | 202 |
| recessed helix | 203 |
| hub | 204 |
| opening | 205 |
| motor | 206 |
| first sensor | 250 |
| second sensor | 251 |
| conveyer path | 300 |
| controller | 400 |
| user input device | 401 |
| pressure generator | 402 |
| conveyer motor | 403 |

The invention claimed is:

1. An apparatus comprising:
   a conveyer path;
   a hopper configured to receive a plurality of pellet-shaped articles and direct the pellet-shaped articles towards the conveyer path, the hopper having a first hopper wall that faces the interior of the hopper, the first hopper wall being configured to contain the pellet-shaped articles and direct the pellet-shaped articles towards the conveyer path; and
   a first plurality of openings to direct a flow of air into the hopper, the first plurality of openings being formed on the first hopper wall in a first row oriented parallel to the conveyer path.

2. The apparatus of claim 1, further comprising:
   a second hopper wall positioned opposite the first hopper wall relative to the conveyer path, the first and second hopper walls being configured to contain the pellet-shaped articles and direct the pellet-shaped articles towards the conveyer path; and
   a second plurality of openings being formed on the second hopper wall in a second row oriented parallel to the conveyer path.

3. The apparatus of claim 1, wherein the hopper further comprises a hopper rail that faces the interior of the hopper, the hopper rail being configured to contain the pellet-shaped articles and direct the pellet-shaped articles towards the conveyer path, the hopper rail supporting the first hopper wall.

4. The apparatus of claim 2, further comprising:
   two hopper rails positioned opposite one another relative to the conveyer path, the hopper rails being configured to contain the pellet-shaped articles and direct the pellet-shaped articles towards the conveyer path, and the hopper rails supporting corresponding hopper walls.

5. The apparatus of claim 1, wherein the first row of openings extends along the entire length of a portion of the conveyer path that passes the hopper.

6. The apparatus of claim 1, wherein the first row of openings extends along less than the full length of a portion of the conveyer path that passes through the hopper.

7. The apparatus of claim 3, further comprising a screw drive positioned adjacent the conveyer path and configured to direct the pellet-shaped articles into the conveyer path, the screw drive being connected to the hopper rail.

8. The apparatus of claim 4, further comprising a screw drive connected to each of the hopper rails, each screw driveof the screw drives being positioned adjacent the conveyer path and configured to direct the pellet-shaped articles into the conveyer path.

9. The apparatus of claim 1, further comprising a plurality of carrier links configured to pass through the hopper along the conveyer path, each of the carrier links having one or more pockets, each of the pockets being configured to retain one of the pellet-shaped articles.

10. The apparatus of claim 9, further comprising a pressure generator configured to generate the flow of air at a pressure greater than ambient, the pressure generator further comprising a pump, a solenoid, or a blower.

11. The apparatus of claim 10, wherein the pressure generator is configured to generate the flow of air continuously during operation of the apparatus while the carrier links are traveling along the conveyer path.

12. The apparatus of claim 10, wherein the pressure generator is configured to generate the flow of air in periodic pulses during operation of the apparatus while the carrier links are traveling along the conveyer path.

13. The apparatus of claim 10, wherein the pressure generator is configured to generate the flow of air at a pressure value that remains substantially consistent during operation of the apparatus while the carrier links are traveling along the conveyer path.

14. The apparatus of claim 10, wherein the pressure generator is configured to generate the flow of air at a pressure value that varies during operation of the apparatus while the carrier links are traveling along the conveyer path.

15. The apparatus of claim 10, further comprising a controller configured to control the apparatus.

16. The apparatus of claim 15, wherein the controller is configured to control the pressure generator to generate the flow of air automatically during operation of the apparatus while the carrier links are traveling along the conveyer path without user input.

17. The apparatus of claim 15, wherein the controller is configured to control the pressure generator to generate the flow of air manually during operation of the apparatus while the carrier links are traveling along the conveyer path in response to user input to a user input device.

18. The apparatus of claim 15, further comprising:
a first sensor in communication with the controller and configured to detect whether pellet-shaped articles are being conveyed along the conveyer path; and
a second sensor in communication with the controller and configured to detect whether pellet-shaped articles are contained within the hopper.

19. The apparatus of claim 9, further comprising a conveyer motor configured to drive the carrier links along the conveyer path.

20. An apparatus comprising:
a conveyer path;
a hopper configured to receive a plurality of pellet-shaped articles and direct the pellet-shaped articles towards the conveyer path, the hopper comprising:
a first hopper wall that faces the interior of the hopper, the first hopper wall being configured to contain the pellet-shaped articles and direct the pellet-shaped articles towards the conveyer path; and
a first hopper rail that faces the interior of the hopper, the first hopper rail being configured to contain the pellet-shaped articles and direct the pellet-shaped articles towards the conveyer path, the first hopper rail supporting the first hopper wall; and
a first plurality of openings to direct a flow of air into the hopper, the first plurality of openings being formed on the first hopper rail in a first row oriented parallel to the conveyer path.

21. The apparatus of claim 20, further comprising:
a second hopper wall positioned opposite the first hopper wall relative to the conveyer path, the first and second hopper walls being configured to contain the pellet-shaped articles and direct the pellet-shaped articles towards the conveyer path;
a second hopper rail positioned opposite the first hopper rail relative to the conveyer path, the second hopper rail being configured to contain the pellet-shaped articles and direct the pellet-shaped articles towards the conveyer path, the second hopper rail supporting the second hopper wall; and
a second plurality of openings to direct a flow of air into the hopper, the second plurality of openings being formed on the second hopper rail in a second row oriented parallel to the conveyer path.

22. The apparatus of claim 21, further comprising a screw drive connected to each of the hopper rails, each of the screw drives being positioned adjacent the conveyer path and configured to direct the pellet-shaped articles into the conveyer path.

23. The apparatus of claim 20, further comprising a screw drive positioned adjacent the conveyer path and configured to direct the pellet-shaped articles into the conveyer path, the screw drive being connected to the first hopper rail.

24. The apparatus of claim 20, wherein the first row of openings extends along the entire length of a portion of the conveyer path that passes the hopper.

25. The apparatus of claim 20, wherein the first row of openings extends along less than the full length of a portion of the conveyer path that passes through the hopper.

26. The apparatus of claim 20, further comprising a plurality of carrier links configured to pass through the hopper along the conveyer path, each of the carrier links having one or more pockets, each of the pockets being configured to retain one of the pellet-shaped articles.

27. The apparatus of claim 26, further comprising a pressure generator configured to generate the flow of air at a pressure greater than ambient, the pressure generator further comprising a pump, a solenoid, or a blower.

28. The apparatus of claim 27, wherein the pressure generator is configured to generate the flow of air continuously during operation of the apparatus while the carrier links are traveling along the conveyer path.

29. The apparatus of claim 27, wherein the pressure generator is configured to generate the flow of air in periodic pulses during operation of the apparatus while the carrier links are traveling along the conveyer path.

30. The apparatus of claim 27, wherein the pressure generator is configured to generate the flow of air at a pressure value that remains substantially consistent during operation of the apparatus while the carrier links are traveling along the conveyer path.

31. The apparatus of claim 27, wherein the pressure generator is configured to generate the flow of air at a pressure value that varies during operation of the apparatus while the carrier links are traveling along the conveyer path.

32. The apparatus of claim 27, further comprising a controller configured to control the apparatus.

33. The apparatus of claim 32, wherein the controller is configured to control the pressure generator to generate the flow of air automatically during operation of the apparatus while the carrier links are traveling along the conveyer path without user input.

34. The apparatus of claim 32, wherein the controller is configured to control the pressure generator to generate the flow of air manually during operation of the apparatus while the carrier links are traveling along the conveyer path in response to user input to a user input device.

35. The apparatus of claim 32, further comprising:
   a first sensor in communication with the controller and configured to detect whether pellet-shaped articles are being conveyed along the conveyer path; and
   a second sensor in communication with the controller and configured to detect whether pellet-shaped articles are contained within the hopper.

36. The apparatus of claim 26, further comprising a conveyer motor configured to drive the carrier links along the conveyer path.

* * * * *